United States Patent
Balmakhtar et al.

(10) Patent No.: US 12,245,025 B2
(45) Date of Patent: Mar. 4, 2025

(54) DATA COMMUNICATION SERVICE OVER A VIRTUAL PRIVATE NETWORK GATEWAY, APPLICATION FUNCTION, AND NETWORK EXPOSURE FUNCTION

(71) Applicant: T-MOBILE INNOVATIONS LLC, Overland Park, KS (US)

(72) Inventors: Marouane Balmakhtar, Fairfax, VA (US); Zheng Fang, McLean, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 18/465,466

(22) Filed: Sep. 12, 2023

(65) Prior Publication Data

US 2023/0422029 A1 Dec. 28, 2023

Related U.S. Application Data

(63) Continuation of application No. 17/237,638, filed on Apr. 22, 2021, now Pat. No. 11,792,642.

(51) Int. Cl.
| | |
|---|---|
| *H04L 9/00* | (2022.01) |
| *H04L 9/40* | (2022.01) |
| *H04L 12/46* | (2006.01) |
| *H04W 4/20* | (2018.01) |
| *H04W 8/20* | (2009.01) |
| *H04W 12/03* | (2021.01) |

(52) U.S. Cl.
CPC ......... *H04W 12/03* (2021.01); *H04L 12/4675* (2013.01); *H04L 63/0272* (2013.01); *H04W 4/20* (2013.01); *H04W 8/20* (2013.01)

(58) Field of Classification Search
CPC ......... H04W 8/20; H04W 4/20; H04W 12/03; H04L 63/0272; H04L 12/4675
USPC .......................................................... 726/15
See application file for complete search history.

(56) References Cited

U.S. PATENT DOCUMENTS

| | | |
|---|---|---|
| 9,514,424 B2 | 12/2016 | Kleinbart et al. |
| 9,912,531 B2 | 3/2018 | Neff et al. |

(Continued)

FOREIGN PATENT DOCUMENTS

| | | | | |
|---|---|---|---|---|
| EP | 2592808 A1 | 5/2013 | | |
| WO | WO-2021083553 A1 * | 5/2021 | ......... | H04L 41/0894 |

(Continued)

OTHER PUBLICATIONS

"Untrusted Non-3GPP Access Network Interworking with 5G Core, Using Non 3-GPP Interworking Function (N3IFW)"; Wipro; Jun. 2020; 21 pages; https://www.wipro.com/network-edge-providers/untrusted-non-3gpp-access-network-interworking-with-5g-core/.

(Continued)

*Primary Examiner* — Josnel Jeudy

(57) ABSTRACT

A data communication system serves a user application in a User Equipment (UE). The data communication system receives a subscription from an application server into a Network Exposure Function (NEF). The subscription is for user data from the user application in the UE. The data communication system receives the user data from the user application in the UE over a Virtual Private Network (VPN) and transfers the user data to the NEF. The data communication system transfers the user data from the NEF for delivery to the application server in response to the subscription.

20 Claims, 8 Drawing Sheets

(56) References Cited

U.S. PATENT DOCUMENTS

| | | |
|---|---|---|
| 10,438,692 B2 | 10/2019 | Neff |
| 10,652,098 B2 | 5/2020 | Kim |
| 10,791,508 B2 | 9/2020 | Park et al. |
| 2002/0010866 A1 | 1/2002 | McCullough et al. |
| 2005/0195780 A1 | 9/2005 | Haverinen et al. |
| 2016/0328577 A1* | 11/2016 | Howley ............... G16H 20/60 |
| 2019/0268973 A1 | 8/2019 | Bull et al. |
| 2019/0319858 A1 | 10/2019 | Das et al. |
| 2020/0067831 A1 | 2/2020 | Spraggins et al. |
| 2021/0377858 A1* | 12/2021 | Huang ............... H04W 52/0229 |
| 2022/0095319 A1* | 3/2022 | Duan ................... H04W 16/14 |
| 2022/0225223 A1 | 7/2022 | Huang et al. |
| 2022/0255996 A1* | 8/2022 | Huang ................. H04L 51/224 |
| 2022/0337995 A1* | 10/2022 | Baek ....................... H04W 8/02 |
| 2022/0405153 A1 | 12/2022 | Xu |
| 2023/0094027 A1 | 3/2023 | Krishan |
| 2023/0156650 A1 | 5/2023 | Salkintzis et al. |
| 2024/0333623 A1* | 10/2024 | Chou ................. H04L 12/1407 |

FOREIGN PATENT DOCUMENTS

| | | | |
|---|---|---|---|
| WO | WO-2021202891 A1 * | 10/2021 | ........ H04W 36/0022 |
| WO | 2022204042 A1 | 9/2022 | |
| WO | WO-2023161242 A1 * | 8/2023 | |

OTHER PUBLICATIONS

"3rd Generation Partnership Project; Technical Specification Group Services and System Aspects; Security architecture and procedures for 5G system (Release 18)"; 3GPP; Mar. 2023; pp. 1-293; 3GPP TS 33.501 V18.1.0; 3GPP; Sophia Antipolis, France.

\* cited by examiner

DATA COMMUNICATION SERVICE OVER A VIRTUAL PRIVATE NETWORK GATEWAY, APPLICATION FUNCTION, AND NETWORK EXPOSURE FUNCTION

RELATED CASES

This United States patent application is a continuation of U.S. patent application Ser. No. 17/237,638 that was filed on Apr. 22, 2021 and is entitled "DATA COMMUNICATION SERVICE OVER A VIRTUAL PRIVATE NETWORK GATEWAY, APPLICATION FUNCTION, AND NETWORK EXPOSURE FUNCTION." U.S. patent application Ser. No. 17/237,638 is hereby incorporated by reference into this United States patent application.

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless user devices execute user applications that use the wireless data services. For example, a smartphone may execute a social-networking application that communicates with a content server over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The network elements comprise Access and Mobility Management Functions (AMFs), Session Management Functions (SMFs), User Plane Functions (UPFs), Network Exposure Functions (NEFs), Application Functions (AFs), and the like.

The NEFs expose network capabilities and events to the AFs. The AFs have Application Programming Interface (APIs) to interact with the NEFs. The AFs are often linked to external Application Servers (AS) that control data communication services for groups of the wireless user devices. For example, a NEF may expose an attachment event for a specific wireless user device to an AS over an AF, and the AS may direct the NEF over the AF to modify data session quality for the wireless user device.

Virtual Private Networks (VPNs) use cryptography to encrypt/decrypt and exchange user data. Many wireless user devices use VPNs to securely communicate over the Internet. Unfortunately, the VPNs and NEFs do not interact effectively. Moreover, the VPNs do not efficiently exchange user data for the wireless user devices under the control of wireless communication network elements.

TECHNICAL OVERVIEW

In some examples, a data communication system serves a user application in a User Equipment (UE). The data communication system receives a subscription from an application server into a Network Exposure Function (NEF). The subscription is for user data from the user application in the UE. The data communication system receives the user data from the user application in the UE over a Virtual Private Network (VPN) and transfers the user data to the NEF. The data communication system transfers the user data from the NEF for delivery to the application server in response to the subscription.

In some examples, a NEF receives a usage data subscription for a UE. The NEF receives UE signaling from the UE over a Virtual Private Network (VPN) and transfers the UE signaling to a network function. The network function receives the UE signaling from the NEF, and in response, transfers network signaling to the NEF. The NEF receives the network signaling from the network function and transfers the network signaling to the VPN. The VPN exchanges data for the user application between the UE and an external data system based on the network signaling. The NEF transfers usage data that characterizes the data exchange to the application server in response to the usage data subscription.

DETAILED DESCRIPTION

Figure 1:
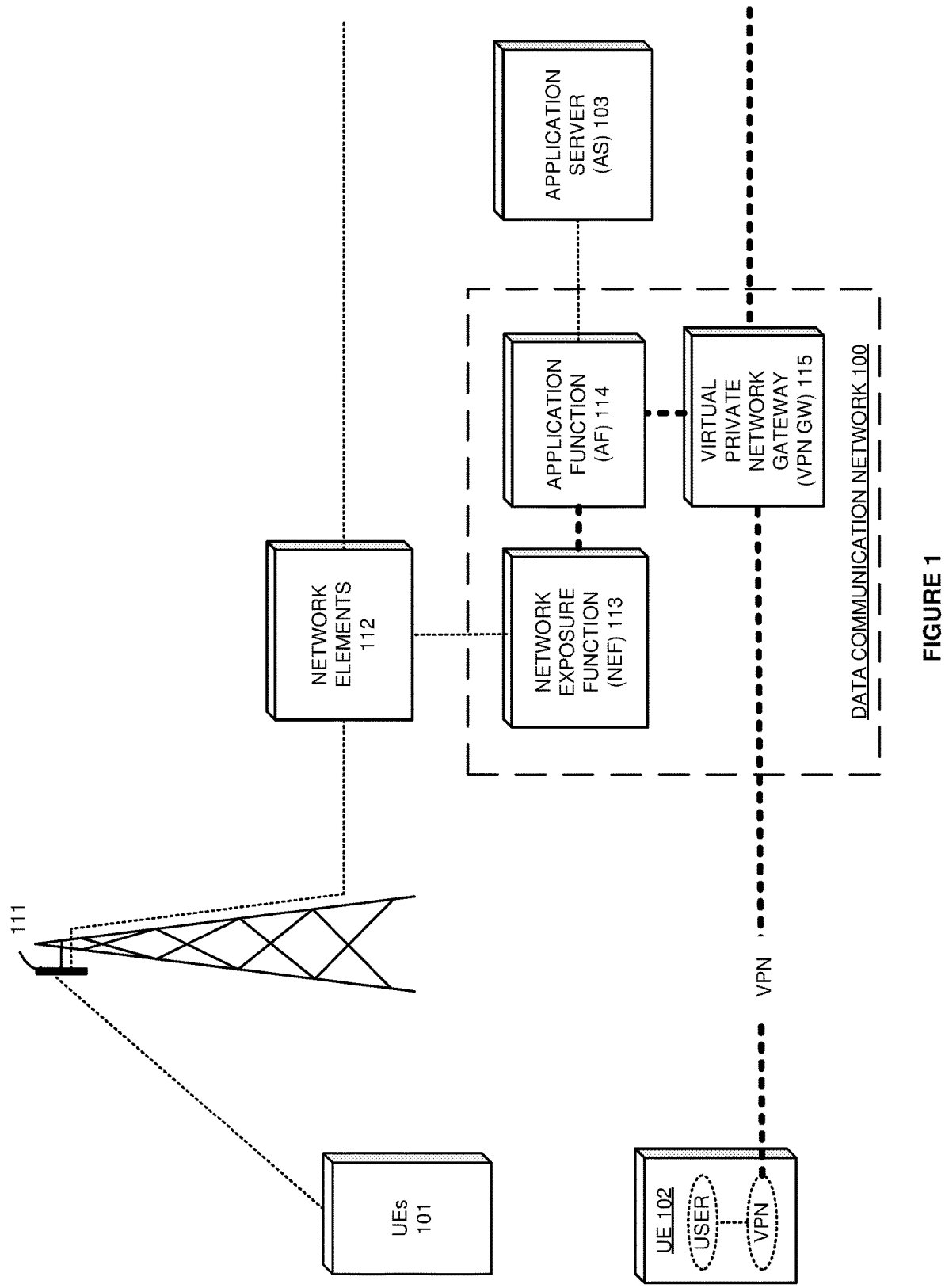
FIG. 1 illustrates a data communication network that serves a user application in a User Equipment (UE) over a Virtual Private Network Gateway (VPN-GW), Application Function (AF), and Network Exposure Function (NEF).

FIG. 1 illustrates data communication network 100 that serves a user application (USER) in User Equipment (UE) 102. Data communication network 100 comprises Network Exposure Function (NEF) 113, Application Function (AF) 114, and Virtual Private Network Gateway (VPN-GW) 115. AF 114 may comprise multiple AFs, but AF 114 is shown as a single AF for clarity. UEs 101 wirelessly exchange user data with Radio Access Network (RAN) 111. RAN 111 exchanges the user data with network elements 112 which exchange the user data with external systems. RAN 111 and network elements 112 deliver services to UEs 101 like internet-access, machine-control, media-streaming, or some other data communications product. UEs 101 comprise computers, phones, vehicles, sensors, robots, or some other data appliances with wireless communication circuitry.

Various examples of network operation and configuration are described herein. In some examples, the user application in UE 101 transfers user data to a VPN application (VPN) in UE 101. The VPN application transfers the user data over a VPN to VPN-GW 115 for delivery to NEF 113. VPN-GW 115 transfers the user data to AF 114 for delivery to NEF 115. AF 114 generates an Application Programming Interface (API) call with the user data and transfers the API call to NEF 113. NEF 113 receives the API call and responsively exposes the user data. For example, NEF 113 may expose the user data to Application Server (AS) 103 over AF 114 in response to a prior user data subscription form AS 103.

In some examples, the user data comprises network signaling, and thus, NEF 113 exposes network signaling from the user application in UE 101. In response to the network signaling from UE 101, network elements 112 generate and transfer additional network signaling to NEF 113. NEF 113 generates an API response with the additional network signaling and transfers the API response to AF 114. AF 114 receives the API response and responsively transfers the additional network signaling to VPN-GW 115. In UE 101, the user application transfers user data to the VPN application for delivery to an external data system. The VPN application in UE 101 transfers the additional user data over the VPN to VPN-GW 115 for delivery to the external data system. VPN-GW 115 transfers the user data to the external data system in response to the additional network signaling from network elements 112.

In some examples, VPN GW 115 generates and transfers usage data to AF 114 that characterizes the user data transfer. AF 114 generates an API call with the usage data and transfers the API call to NEF 113. NEF 113 responsively exposes the usage data. For example, NEF 113 may expose the usage data to network elements 112 and/or AS 103 in response to a prior usage data subscription. Advantageously, VPN GW 115 and NEF 113 interact effectively over AF 114. Moreover, VPN GW 115 efficiently exchanges user data for UE 102 under the control of AS 103 and network elements 112.

UEs 101 communicate with RAN 111 over technologies like Fifth Generation New Radio (5GNR), Long Term Evolution (LTE), Institute of Electrical and Electronic Engineers (IEEE) 802.11 (WIFI), LP-WAN, or some other wireless protocol. The wireless communication technologies use electromagnetic frequencies in the low-band, mid-band, high-band, or some other portion of the electromagnetic spectrum. RAN 111, network elements 112, NEF 113, AF 114, VPN GW 115, UEs 102, and AS 103 are coupled over data links that use metallic wiring, glass fibers, radio channels, or some other communication media. The data links use Institute of Electrical and Electronic Engineers (IEEE) 802.3 (Ethernet), Time Division Multiplex (TDM), Data Over Cable System Interface Specification (DOCSIS), WIFI, Internet Protocol (IP), General Packet Radio Service Transfer Protocol (GTP), 5GNR, LTE, WIFI, virtual switching, inter-processor communication, bus interfaces, and/or some other data communication protocols.

UEs 101, RAN 111, and possibly UEs 102 comprise antennas, amplifiers, filters, modulation, analog/digital interfaces, microprocessors, software, memories, transceivers, bus circuitry, and the like. Network elements 112, NEF 113, AF 114, VPN GW 115, and AS 103 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of data communication network 100 as described herein.

Figure 2:
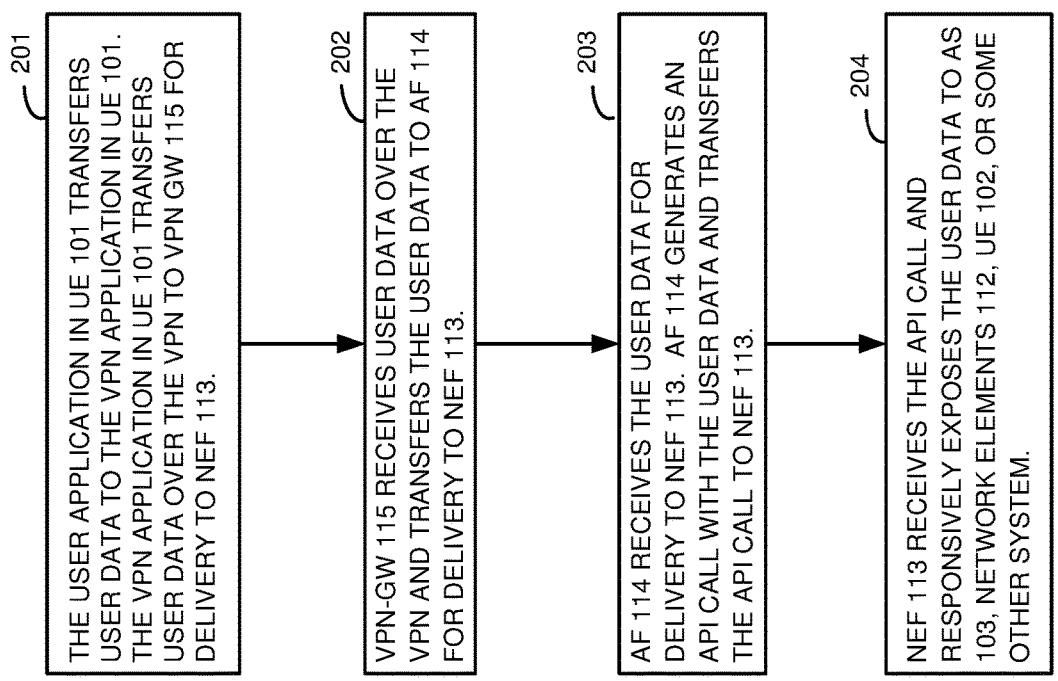
FIG. 2 illustrates an exemplary operation of the data communication network to serve the user application in the UE over the VPN-GW, AF, and NEF.

FIG. 2 illustrates an exemplary operation of data communication network 100 to serve the user application in UE 102 over VPN-GW 115, AF 114, and NEF 113. The operation may vary in other examples. The user application in UE 101 transfers user data to the VPN application in UE 101 (201). The VPN application comprises software that interacts with VPN GW 115 to establish an encrypted communication channel between the VPN application and VPN GW 115—often at the IP layer. The VPN application in UE 101 transfers user data over the encrypted communication channel (the VPN) to VPN GW 115 for delivery to NEF 113 (201). VPN-GW 115 receives user data over the VPN and transfers the user data to AF 114 for delivery to NEF 113 (202). AF 114 receives the user data for delivery to NEF 113 (203). AF 114 generates an API call with the user data and transfers the API call to NEF 113 (203). NEF 113 receives the API call and responsively exposes the user data to AS 103, network elements 112, UE 102, or some other system (204).

Figure 3:
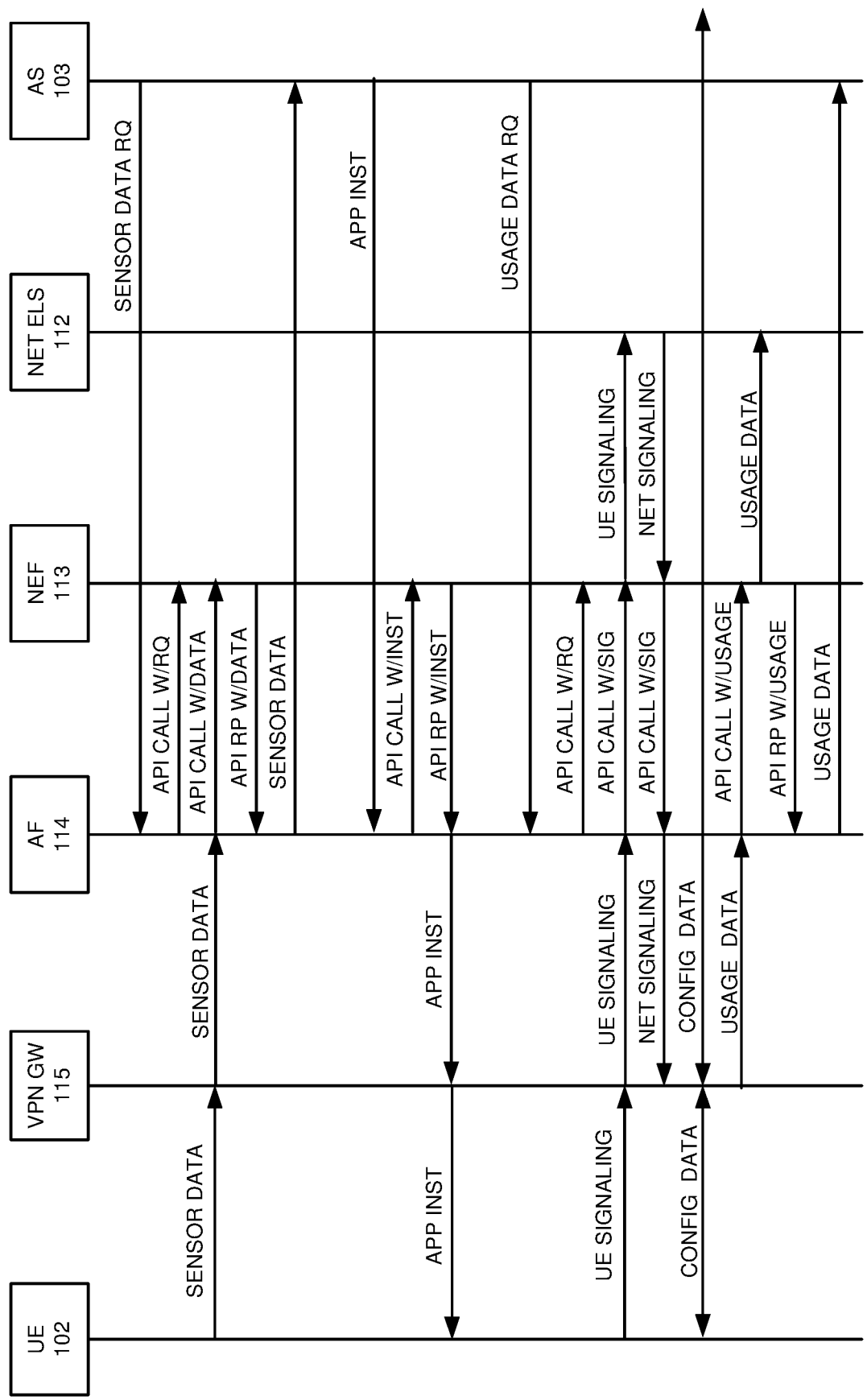
FIG. 3 illustrates an exemplary operation of the data communication network to serve the user application in the UE over the VPN-GW, AF, and NEF.

FIG. 3 illustrates an exemplary operation of data communication network 100 to serve the user application in UE 102 over VPN-GW 115, AF 114, and NEF 113. The operation may vary in other examples. AS 103 transfers a request (RQ) for sensor data from the user application in UE 102 to AF 114. AF 114 generates and transfers an API call with the sensor data request to NEF 113.

The user application in UE 102 generates sensor data, and UE 102 transfers the sensor data over the VPN to VPN GW 115 for delivery to NEF 113. VPN GW 115 transfers the sensor data to AF 114 for delivery to NEF 113. AF 114 generates an API call with the sensor data and transfers the API call to NEF 113. NEF 113 receives the API call, and in responsive to the request from AS 103, NEF generates and transfers an API response (RP) with the sensor data to AF 114 for delivery to AS 103. AF 114 receives the API response and transfers the sensor data to AS 103. In some examples, different AFs are used to link NEF 113 with VPN GW 115 and AS 103.

AS 103 generates an application instruction (APP INST) for the user application in UE 102 to perform a reconfiguration session in response to the sensor data. AS 103 transfers the application instruction to AF 114 for delivery to UE 102. AF 114 generates and transfers an API call with the application instruction to NEF 113. NEF 113 generates an API response with the application instruction and transfers the API response AF 114. AF 114 receives the API response and transfers the application instruction to VPN GW 115 for delivery to UE 102. VPN GW 115 transfers the application instruction over the VPN to UE 102 which forwards the application instruction to the user application.

AS 103 transfers a usage data request for UE 102 to AF 114. AF 114 generates and transfers an API call with the usage data request to NEF 113.

The user application in UE 102 generates UE signaling for a configuration session with a remote configuration server (not shown) in response to the application instruction. UE 102 transfers the UE signaling over the VPN to VPN GW 115 for delivery to NEF 113. VPN GW 115 transfers the UE signaling to AF 114 for delivery to NEF 113. AF 114 generates an API call with the UE signaling and transfers the API call to NEF 113. NEF 113 receives the API call and transfers the UE signaling to network elements 112. For example, NEF 113 may transfer an authorization request to a Uniform Data Repository (UDR) or transfer a policy request to a Policy Control Function (PCF). Network elements 112 generate and transfer network signaling to NEF 113 for delivery to VPN GW 115. NEF 113 generates and transfers an API call with the network signaling to AF 114 for delivery to VPN GW 115. AF 114 receives the API response and transfers the network signaling to VPN GW 115.

The user application in UE 102 generates and consumes configuration (CONFIG) data. UE 102 exchanges the configuration data over the VPN with VPN GW 115. VPN GW 115 exchanges the configuration data with UE 102 over the VPN per the network signaling. VPN GW 115 also exchanges the configuration data with the remote confirmation server per the network signaling.

VPN GW 115 generates and transfers usage data that characterizes the user data exchange to AF 114 for delivery to NEF 113. AF 114 generates an API call with the usage data and transfers the API call to NEF 113. NEF 113 receives the API call and transfers the usage data to network elements 112 like an accounting network element. In response to the usage data request from AS 103, NEF 113 generates and transfers an API response with the usage data to AF 114 for delivery to AS 103. AF 114 receives the API response and transfers the usage data to AS 103.

Figure 4:
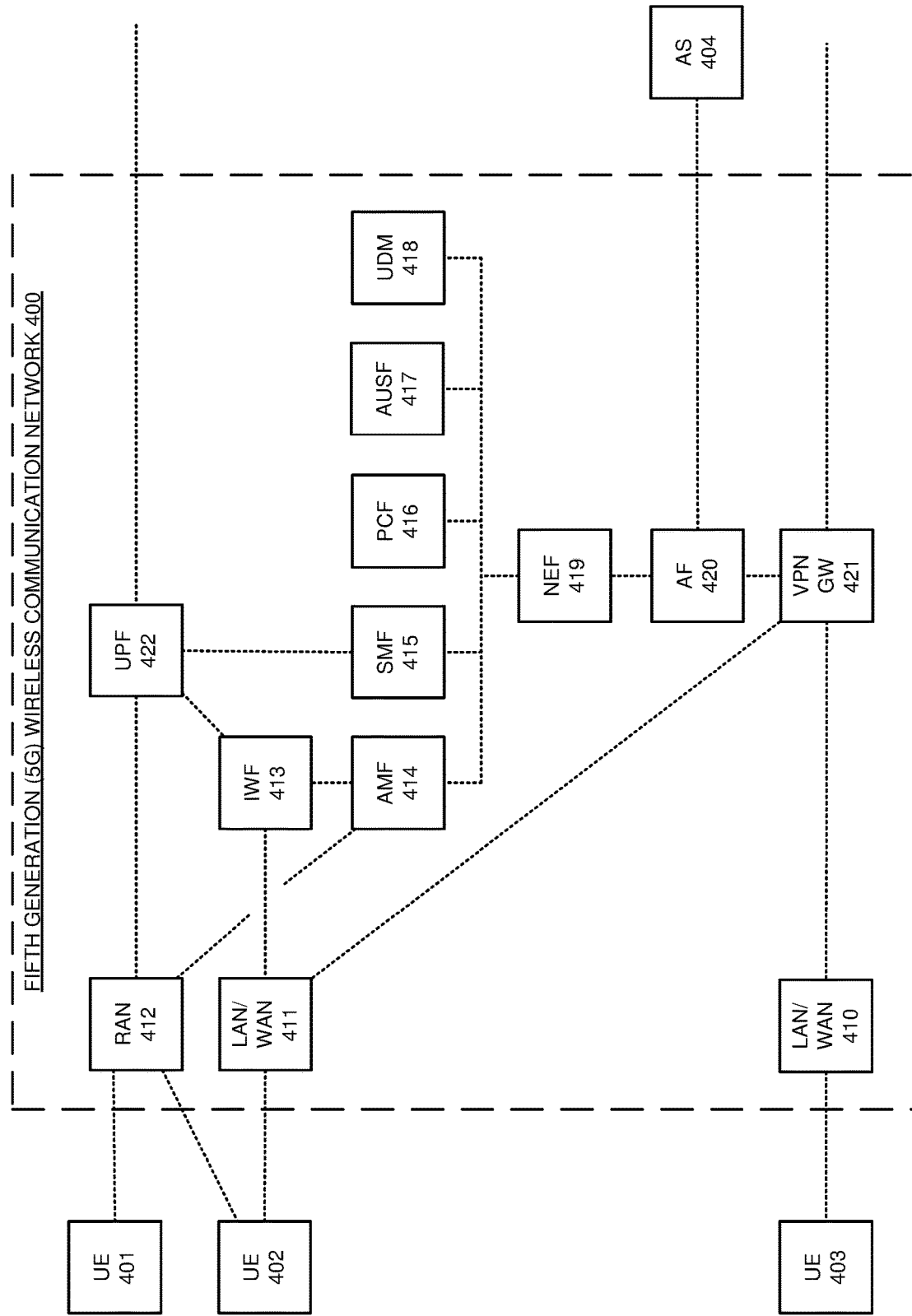
FIG. 4 illustrates a Fifth Generation (5G) communication network to serve UEs over a VPN-GW, AF, and NEF.

FIG. 4 illustrates Fifth Generation (5G) communication network 400 to serve UEs 402-403 over VPN-GW 421, AF 420, and NEF 419. 5G wireless communication network 400 comprises an example of data communication network 100, although network 100 may vary from this example. 5G wireless communication network 400 comprises: UEs 401-403, Local Area Network-Wide Area Network (LAN/WAN) 410, LAN/WAN 411, RAN 412, Interworking Function (IWF) 413, Access and Mobility Management Function (AMF) 414, Session Management Function (SMF) 415, Policy Control Function (PCF) 416, Authentication Server Function (AUSF) 417, Unified Data Management (UDM) 418, Network Exposure Function 419, Application Function (AF) 420, Virtual Private Network Gateway (VPN GW) 421, and User Plane Function (UPF) 412. AF 420 is linked to Application Server (AS) 404.

UE 401 exchanges user data with external systems over RAN 412 and UPF 422 under the control of network functions 414-418 (AMF 414, SMF 425, PCF 416, AUSF 417, and UDM 418). UE 402 exchanges user data with external systems over RAN 412 and UPF 422 under the control of network functions 414-418. UE 402 also exchanges user data with external systems over LAN/WAN 411, IWF 413, and UPF 422 under the control of network functions 414-418. In addition, UE 402 exchanges user data with external systems over LAN/WAN 410 and VPN GW 421 under the control of network functions 414-418 and NEF 419. UE 403 exchanges user data with external systems over LAN/WAN 410 and VPN GW 421 under the control of network functions 414-418 and NEF 419. AS 404 and UEs 402-403 may exchange user data over AF 420, NEF 419, VPN GW 421 and LAN/WAN 410. Network functions 414-418 and UEs 402-403 exchange network signaling like Non-Access Stratum (NAS) files over AF 420, NEF 419, VPN GW 421, and LAN/WAN 410. The network signaling may indicate the user applications or applications in UE 402 that are using VPN GW 421.

In an exemplary operation, AS 404 subscribes to location and usage data for UE 402 over AF 420. AF 420 transfers the subscription to NEF 419 in an API call. When UE 402 uses RAN 412 and UPF 422, then AMF 414 notifies NEF 419 which notifies AS 404 over AF 420 in response to the subscription. When UE 402 uses LAN/WAN 411, IWF 413, and UPF 422, then AMF 414 notifies NEF 419 which notifies AS 404 over AF 420 in response to the subscription. When UE 402 uses LAN/WAN 411 and VPN GW 421, then VPN GW 421 notifies AF 420 which notifies NEF 419, and in response to the subscription, NEF 419 notifies AS 404 over AF 420. To use VPN GW 421, a VPN application in UE 402 and VPN GW 421 exchange signaling over LAN/WAN 411 to establish the encrypted communication for the VPN. VPN GW 421 authenticates UE 402 on a hardware and/or software level by obtaining hardware and/or software IDs (or their hashes) from UE 402. VPN GW 421 may obtain credentials from network functions 414-418 to use for authentication. For example, VPN GW 421 may obtain Extensible Authentication Protocol (EAP) credentials for UEs 402-403 from AUSF 417. VPN GW 421 may require UE 402 to obtain authentication from AMF 414, AUSF 417, and UDM 418. VPN GW 421 signals AF 420 that UE 402 has been authenticated, and AF 420 signals NEF 419 of the authentication event. NEF 419 retrieves VPN service, session, and policy information for UE 402 from network functions 414-418. Network functions 414-418 may push the data for UE 402 to NEF 419 in response to the authentication of UE 402. NEF 419 signals the service, session, and policy information to VPN GW 421 over AF 420. UE 402 exchanges user data with external systems over the VPN and VPN GW 421. VPN GW 421 exchanges the user data per the service, session, and policy information for UE 402 from network functions 414-418. VPN GW 421 generates usage data that characterizes the user data exchange by UE ID, user application ID, UE location, date/time, data rate, data type, data amount, data destination, and the like. VPN GW 421 transfers the usage data to NEF 419 over AF 420. In response to the usage data subscription for UE 402, NEF 419 transfers the usage data to AS 404 over AF 420.

In another exemplary operation, AS 404 subscribes to location and usage data for UE 403 over AF 420. AF 420 transfers the subscription to NEF 419 in an API call. When UE 403 uses LAN/WAN 410 and VPN GW 421, then VPN GW 421 notifies AF 420 which notifies NEF 419, and in response to the subscription, NEF 419 notifies AS 404 over AF 420. The VPN application in UE 403 and VPN GW 421 exchange signaling over LAN/WAN 410 to establish the encrypted communication for the VPN. VPN GW 421 authenticates UE 403 on a hardware and/or software level by obtaining hardware and/or software IDs (or their hashes) from UE 403. VPN GW 421 may obtain credentials from network functions 414-418 to use for authentication. VPN GW 421 signals AF 420 that UE 403 has been authenticated, and AF 420 signals NEF 419 of the authentication event. NEF 419 retrieves VPN service, session, and policy information for UE 403 from network functions 414-418. Network functions 414-418 may push the data for UE 403 to NEF 419 in response to the authentication of UE 403. NEF 419 signals the service, session, and policy information to VPN GW 421 over AF 420. UE 403 exchanges user data with external systems over the VPN and VPN GW 421. VPN GW 421 exchanges the user data per the service, session, and policy information for UE 403 from network functions 414-418. VPN GW 421 generates usage data that characterizes the user data exchange by UE ID, user application ID, UE location, date/time, data rate, data type, data amount, data destination, and the like. VPN GW 421 transfers the usage data to NEF 419 over AF 420. In response to the usage data subscription for UE 403, NEF 419 transfers the usage data to AS 404 over AF 420.

Figure 5:
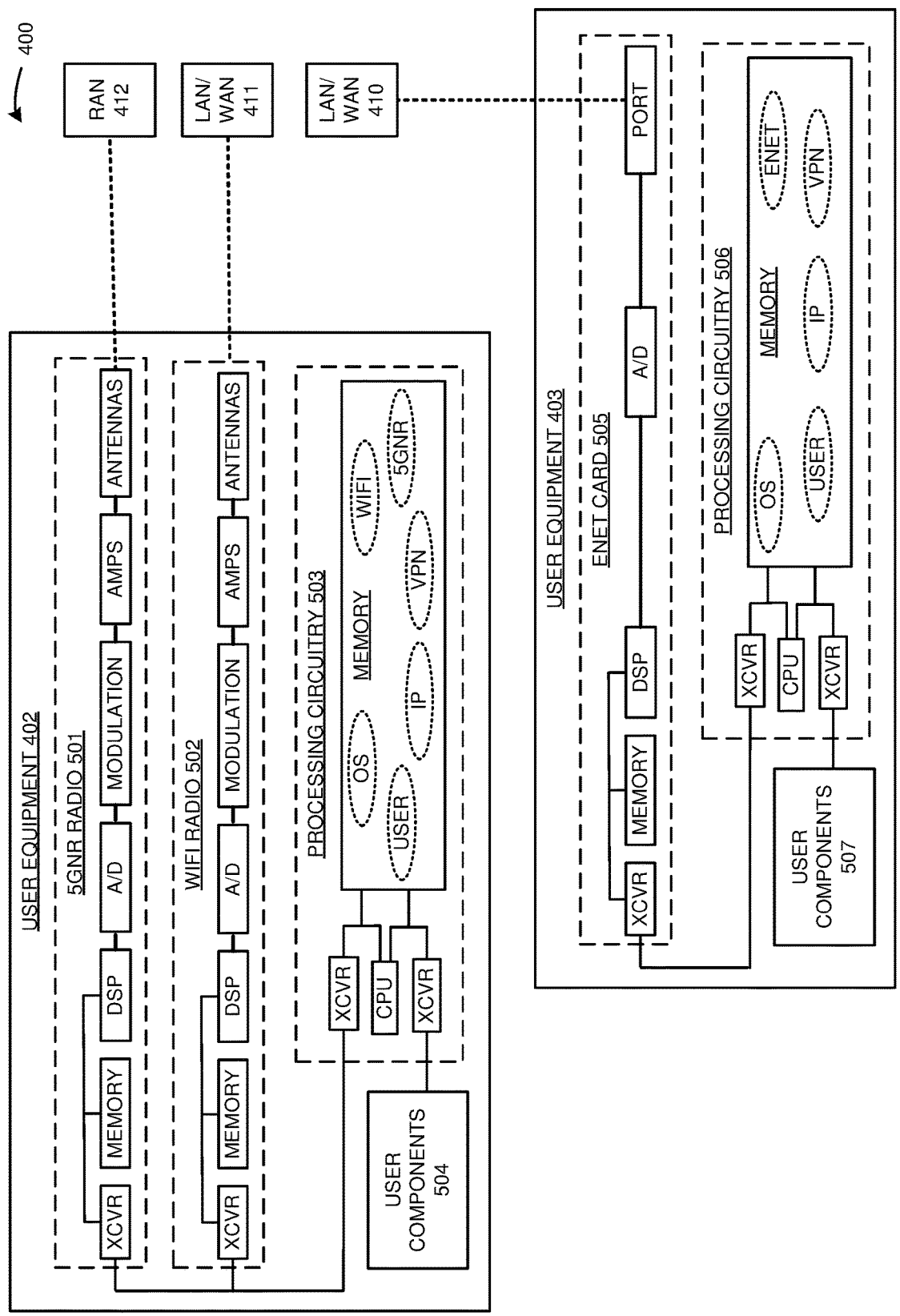
FIG. 5 illustrates the UEs in the 5G wireless communication network.

FIG. 5 illustrates UEs 402-403 in 5G wireless communication network 400. UEs 402-403 comprise an example of UEs 101-102, although UEs 101-102 may differ. UE 402 comprises 5GNR radio 501, WIFI radio 502, processing circuitry 503, and user components 504. Radios 501-502 comprise antennas, amplifiers, filters, modulation, analog-to-digital interfaces, DSP, memory, and transceivers that are coupled over bus circuitry. Processing circuitry 503 comprises memory, CPU, user interfaces and components, and transceivers that are coupled over bus circuitry. The memory in processing circuitry 503 stores an operating system, user applications (USER), and network applications for IP, 5GNR, WIFI, VPN. The 5GNR and WIFI application comprise Physical Layer (PHY), Media Access Control (MAC), Radio Link Control (RLC), Packet Data Convergence Protocol (PDCP), Service Data Adaption Protocol (SDAP), and Radio Resource Control (RRC). The antennas in 5GNR radio 501 are wirelessly coupled to RAN 412 over a 5GNR link. The antennas in WIFI radio 502 are wirelessly coupled to LAN/WAN 411 over a WIFI link. Transceivers (XCVRs) in radios 501-502 are coupled to transceivers in processing circuitry 503. Transceivers in processing circuitry 503 are coupled to user components 504 like displays, controllers, interfaces, and memory. The CPU in processing circuitry 502 executes the operating system, user applications, and network applications to exchange network signaling and user data over 5GNR radio 501 with RAN 412 and over WIFI radio 502 with LAN/WAN 411. In alternative examples, UE 402 may omit the 5GNR components to be WIFI-only or omit the WIFI components to be 5GNR only. UE 402 may add Ethernet components to be 5GNR, WIFI, and Ethernet capable.

UE 403 comprises Ethernet (ENET) card 505, processing circuitry 506, and user components 507. Ethernet card 505 comprises a port, analog-to-digital interface, DSP, memory, and transceiver that are coupled over bus circuitry. Processing circuitry 506 comprises memory, CPU, user interfaces and components, and transceivers that are coupled over bus circuitry. The memory in processing circuitry 506 stores an operating system, user applications, and network applications for IP, Ethernet, and VPN. The port in Ethernet card 505 is wireline coupled to LAN/WAN 410 over an Ethernet link. Transceivers in Ethernet card 505 are coupled to transceivers in processing circuitry 506. Transceivers in processing circuitry 506 are coupled to user components 507 like displays, controllers, interfaces, and memory. The CPU in processing circuitry 506 executes the operating system, user applications, and network applications to exchange network signaling and user data over Ethernet card 505 with LAN/WAN 410. In alternative examples, UE 403 may add 5GNR components to be 5GNR and Ethernet capable or add WIFI components to be Ethernet and WIFI capable.

Figure 6:
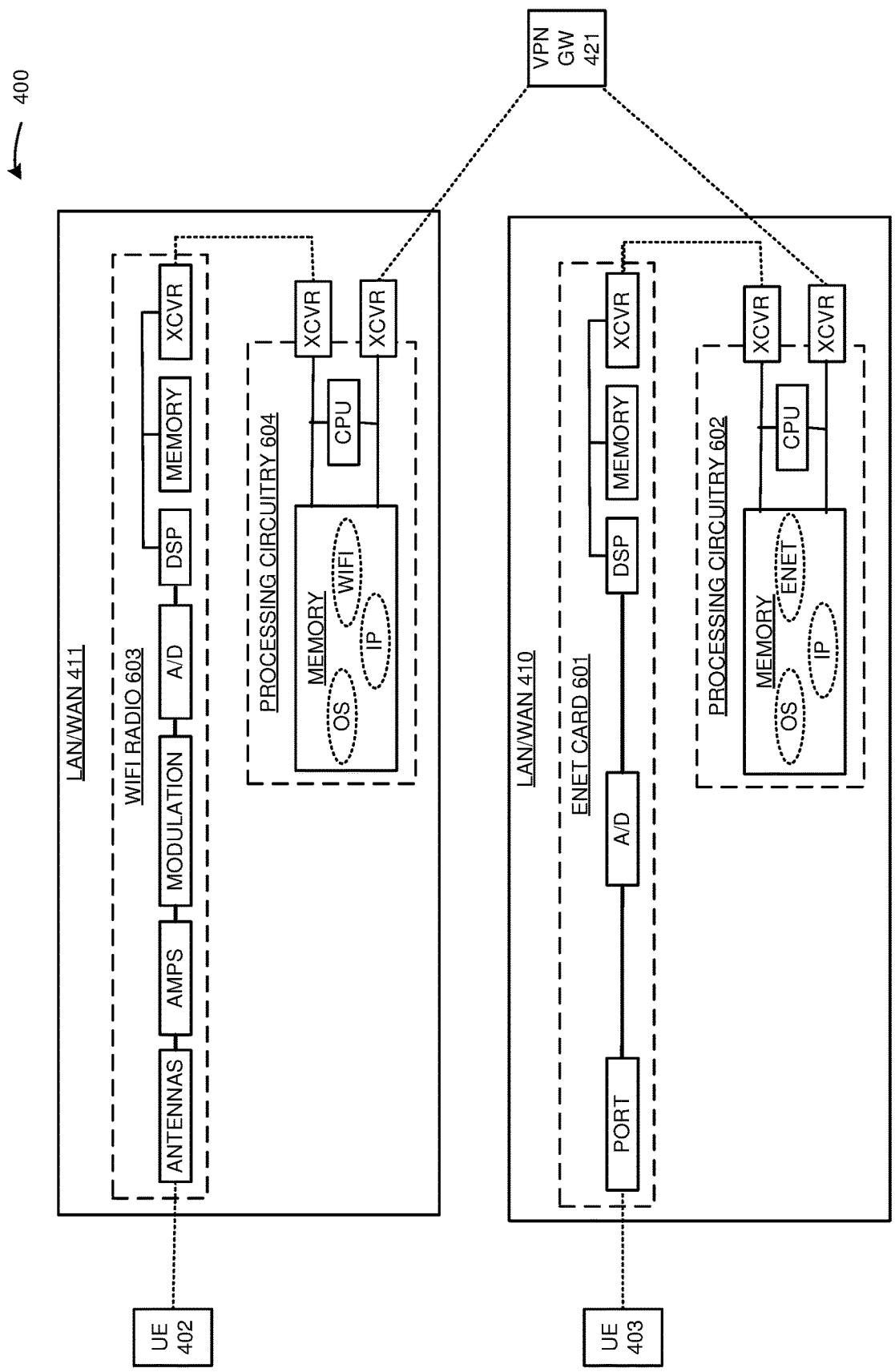
FIG. 6 illustrates a Local Area Network/Wide Area Network (LAN/WAN) in the 5G wireless communication network.

FIG. 6 illustrates Local Area Network/Wide Area Network (LAN/WAN) 410 and LAN/WAN 411 in 5G wireless communication network 400. LAN/WAN 410 comprises Ethernet card 601 and processing circuitry 602. LAN/WAN 411 comprises WIFI radio 603 and processing circuitry 604. Ethernet card 601 comprises a port, analog-to-digital interface, DSP, memory, and transceiver that are coupled over bus circuitry. WIFI Radio 603 comprises antennas, amplifiers, filters, modulation, analog-to-digital interfaces, DSP, memory, and transceivers that are coupled over bus circuitry. Processing circuitries 602 and 604 comprise memory, CPU, user interfaces and components, and transceivers that are coupled over bus circuitry. The memory in processing circuitry 602 stores an operating system, user applications, and network applications for IP and Ethernet. The memory in processing circuitry 604 stores an operating system, user applications, and network applications for IP and WIFI. The port in Ethernet card 601 is wireline coupled to UE 403 over an Ethernet link. The antennas in WIFI radio 603 are wirelessly coupled to UE 402 over a WIFI link. Transceivers (XCVRs) in card 601 and radio 603 are coupled to transceivers in processing circuitries 602 and 604. Transceivers in processing circuitries 602 and 604 are coupled to transceivers in VPN GW 421—possibly over intermediate routers, networks, and the like. The CPU in processing circuitries 602 and 604 execute the operating systems, user applications, and network applications to exchange network signaling and user data with UEs 402-403 and with VPN GW 421. In alternative examples, LAN/WAN 410 may add Ethernet components to be WIFI and Ethernet capable. LAN/WAN 411 may add Ethernet components to be WIFI and Ethernet capable.

Figure 7:
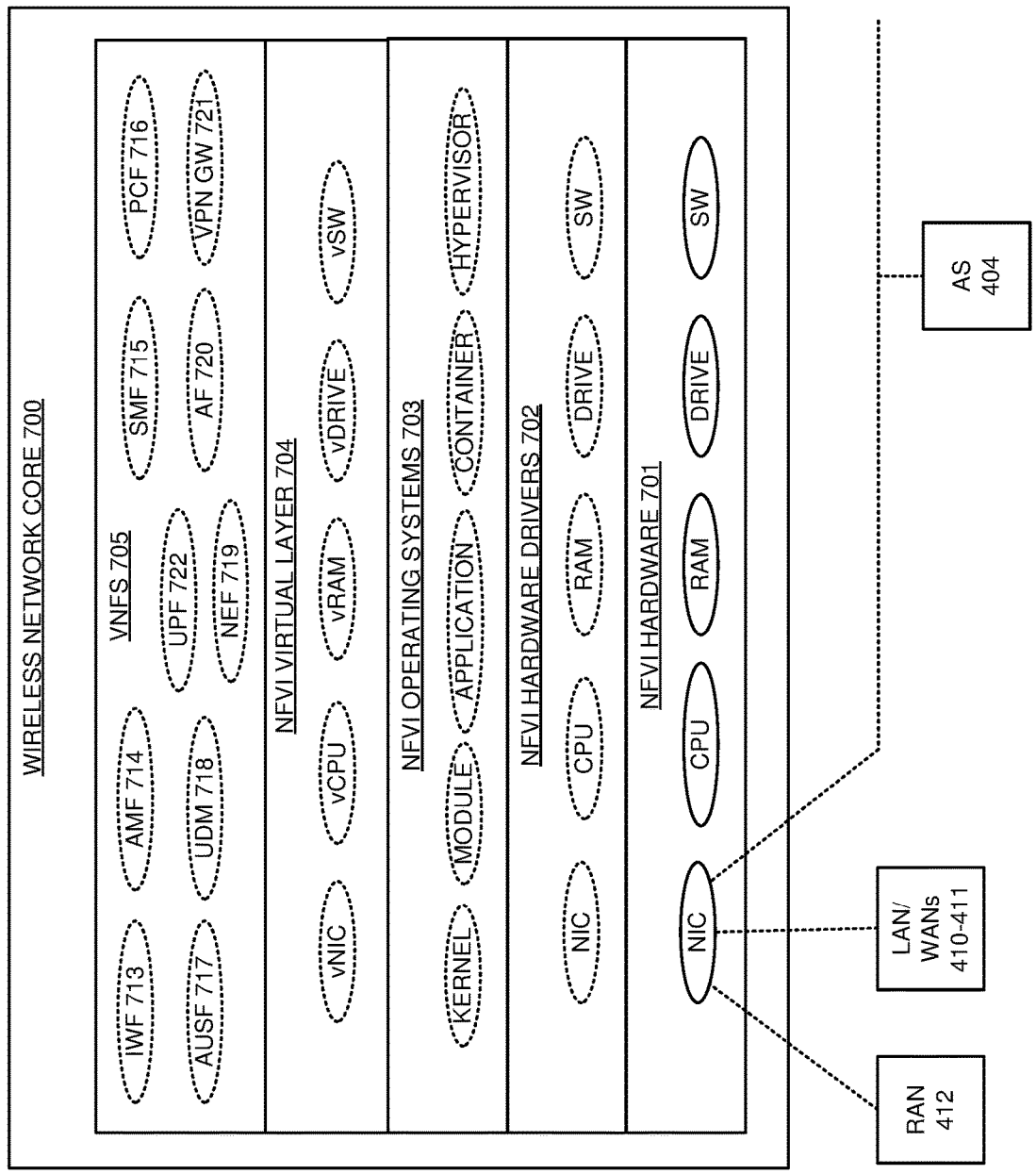
FIG. 7 illustrates a wireless network core in the 5G wireless communication network.

FIG. 7 illustrates wireless network core 700 in 5G wireless communication network 400. Wireless network core 700 comprises an example of data communication network 110 and network elements 112, although data communication network 110 and network elements 112 may differ. Wireless network core 700 comprises Network Function Virtualization Infrastructure (NFVI) hardware 701, NFVI hardware drivers 702, NFVI operating systems 703, NFVI virtual layer 704, and NFVI Virtual Network Functions (VNFs) 705. NFVI hardware 701 comprises Network Interface Cards (NICs), CPU, RAM, Flash/Disk Drives (DRIVE), and Data Switches (SW). NFVI hardware drivers 702 comprise software that is resident in the NIC, CPU, RAM, DRIVE, and SW. NFVI operating systems 703 comprise kernels, modules, applications, containers, hypervisors, and the like. NFVI virtual layer 704 comprises vNIC, vCPU, vRAM, vDRIVE, and vSW. NFVI VNFs 705 comprise IWF 713, AMF 714, SMF 715, PCF 716, UDM 717, UPF 718, NEF 719, AF 720, and VPN GW 721. Other VNFs like Authentication Server Function (AUSF) and Network Repository Function (NRF) are typically present but are omitted for clarity. Wireless network core 700 may be located at a single site or be distributed across multiple geographic locations. The NIC in NFVI hardware 701 are coupled to RAN 412, LAN/WANs 410-411, AS 404, and external systems. NFVI hardware 701 executes NFVI hardware drivers 702, NFVI operating systems 703, NFVI virtual layer 704, and NFVI VNFs 705 to form and operate IWF 413, AMF 414, SMF 415, PCF 416, AUSF 417, UDM 418, NEF 419, AF 420, VPN GW 421, and UPF 422.

Figure 8:
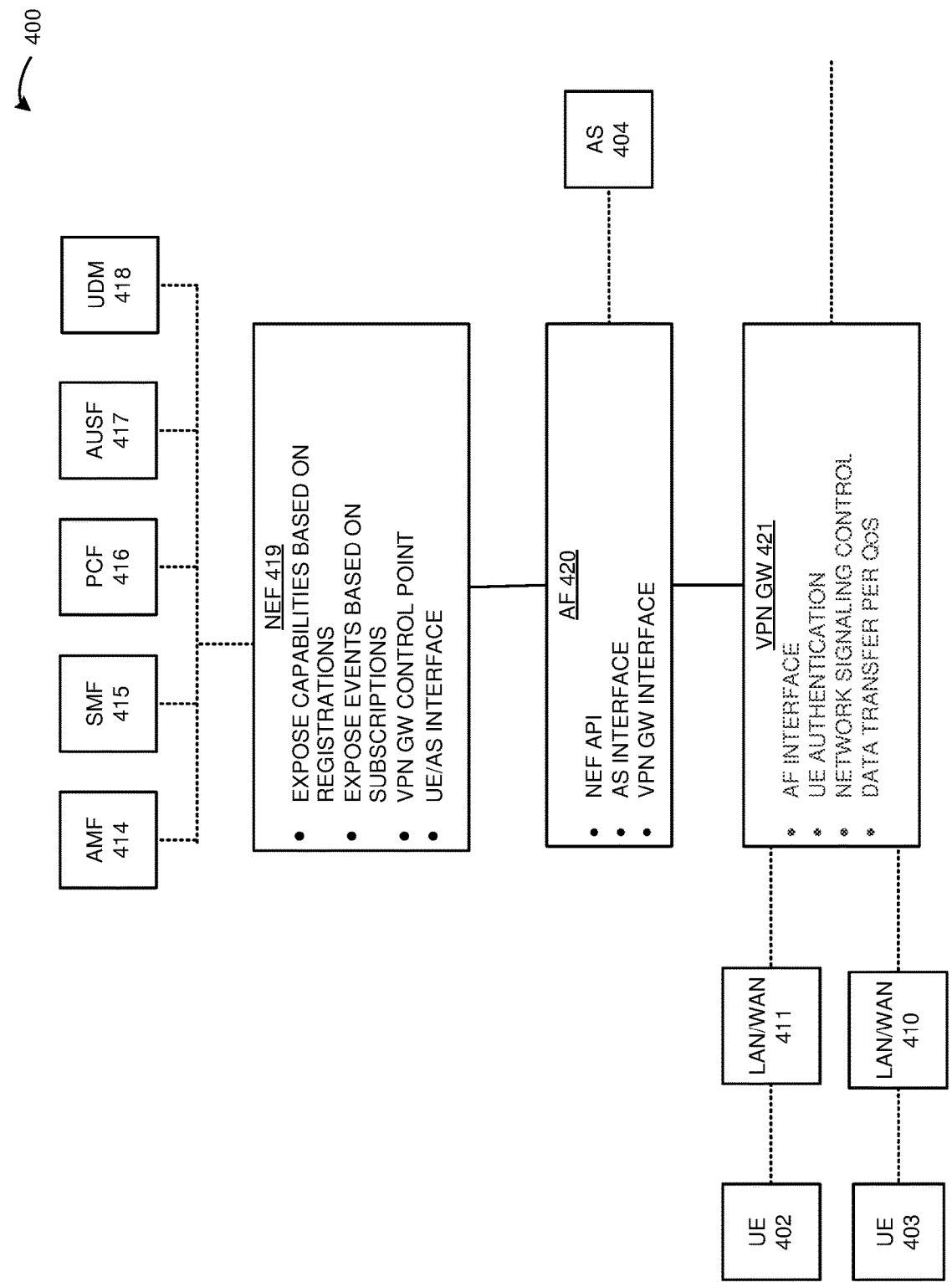
FIG. 8 illustrates an exemplary operation of the 5G communication network to serve the UEs over the VPN-GW, AF, and NEF.

FIG. 8 illustrates an exemplary operation of 5G communication network 400 to serve UEs 402-403 over VPN-GW 421, AF 420, and NEF 419. UE 402 exchanges user data with external systems over LAN/WAN 411 and VPN GW 421. UE 403 exchanges user data with external systems over LAN/WAN 410 and VPN GW 421. VPN GW 421 handles the user data in response to network signaling from network functions 414-418 and NEF 419. AS 404 and UEs 402-403 exchange user data over AF 420, NEF 419, VPN GW 421 and LAN/WANs 410-411. Network functions 414-418 and UEs 402-403 exchange network signaling over AF 420, NEF 419, VPN GW 421, and LAN/WANs 410-411.

AS 404 subscribes to location and usage data for UE 402 over AF 420. AF 420 transfers the subscription to NEF 419. When UE 402 uses LAN/WAN 411 and VPN GW 421, then VPN GW 421 notifies AF 420 which notifies NEF 419, and in response to the subscription, NEF 419 notifies AS 404 over AF 420. To use VPN GW 421, a VPN application in UE 402 and VPN GW 421 exchange signaling over LAN/WAN 410 to establish the secure VPN connection. VPN GW 421 authenticates UE 402 on a hardware and/or software level by obtaining hardware and/or software IDs (or their hashes)

from UE 402. For example, VPN GW 421 may perform EAP authentication for UE 402 with credentials from AUSF 417. VPN GW 420 signals AF 420 that UE 402 has been authenticated, and AF 420 signals NEF 419 of the authentication event. NEF 419 retrieves VPN service, session, and policy information for UE 402 from network functions 414-418 in response to the authentication of UE 402. NEF 419 signals the service and policy information to VPN GW 421 over AF 420. UE 402 exchanges user data with external systems over the LAN/WAN 411 and VPN GW 421. VPN GW 421 exchanges the user data per the VPN service, session, and policy information for UE 402 from network functions 414-418. VPN GW 421 generates usage data that characterizes the user data exchange by UE ID, user application ID, UE location, date/time, data rate, data type, data amount, data destination, and the like. VPN GW 421 transfers the usage data to NEF 419 over AF 420. In response to the usage data subscription for UE 402, NEF 419 transfers the usage data to AS 404 over AF 420. NEF 419 may also transfer the usage data to a network accounting system.

AS 404 subscribes to location and usage data for UE 403 over NEF 420. AF 420 transfers the subscription to NEF 419. When UE 403 uses LAN/WAN 410 and VPN GW 421, then VPN GW 421 notifies AF 420 which notifies NEF 419, and in response to the subscription, NEF 419 notifies AS 404 over AF 420. To use VPN GW 421, a VPN application in UE 403 and VPN GW 421 exchange signaling over LAN/WAN 410 to establish the secure VPN connection. VPN GW 421 authenticates UE 403 on a hardware and/or software level by obtaining hardware and/or software IDs (or their hashes) from UE 403. VPN GW 420 signals AF 420 that UE 403 has been authenticated, and AF 420 signals NEF 419 of the authentication event. NEF 419 retrieves VPN service, session, and policy information for UE 403 from network functions 414-418 in response to the authentication of UE 403. NEF 419 signals the service and policy information to VPN GW 421 over AF 420. UE 403 exchanges user data with external systems over the LAN/WAN 410 and VPN GW 421. VPN GW 421 exchanges the user data per the VPN service, session, and policy information for UE 403 from network functions 414-418. VPN GW 421 generates usage data that characterizes the user data exchange by UE ID, user application ID, UE location, date/time, data rate, data type, data amount, data destination, and the like. VPN GW 421 transfers the usage data to NEF 419 over AF 420. In response to the usage data subscription for UE 403, NEF 419 transfers the usage data to AS 404 over AF 420. NEF 419 may also transfer the usage data to a network accounting system.

The wireless data network circuitry described above comprises computer hardware and software that form special-purpose networking circuitry to serve UEs over VPN-GWs, AFs, and NEFs. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose networking circuitry to serve UEs over VPN-GWs, AFs, and NEFs.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method to serve a user application in a User Equipment (UE), the method comprising:
    receiving a subscription from an application server into a Network Exposure Function (NEF), wherein the subscription is for user data from the user application in the UE;
    receiving the user data from the user application in the UE over a Virtual Private Network (VPN) and transferring the user data to the NEF; and
    transferring the user data from the NEF for delivery to the application server in response to the subscription.

2. The method of claim 1 further comprising:
    generating usage data that characterizes the user data transfer by UE identifier; and
    transferring the UE identifier from the NEF for delivery to the application server in response to the subscription.

3. The method of claim 1 further comprising:
    generating usage data that characterizes the user data transfer by UE location; and
    transferring the UE location from the NEF for delivery to the application server in response to the subscription.

4. The method of claim 1 further comprising:
    generating usage data that characterizes the user data transfer by application identifier; and
    transferring the application identifier from the NEF for delivery to the application server in response to the subscription.

5. The method of claim 1 further comprising:
    generating usage data that characterizes the user data transfer by VPN information; and transferring the VPN information from the NEF for delivery to the application server in response to the subscription.

6. The method of claim 1 further comprising:
generating usage data that characterizes the user data transfer by data amount; and
transferring the data amount from the NEF for delivery to the application server in response to the subscription.

7. The method of claim 1 further comprising:
receiving an application instruction for the user application into the NEF from the application server; and
transferring the application instruction for the user application from the NEF to the UE over the VPN.

8. A method to serve a user application in a User Equipment (UE), the method comprising:
a Network Exposure Function (NEF) receiving a usage data subscription for the UE;
the NEF receiving UE signaling from the UE over a Virtual Private Network (VPN) and transferring the UE signaling to a network function;
the network function receiving the UE signaling from the NEF, and in response, transferring network signaling to the NEF;
the NEF receiving the network signaling from the network function and transferring the network signaling to the VPN;
the VPN exchanging data for the user application between the UE and an external data system based on the network signaling; and
the NEF transferring usage data that characterizes the data exchange to the application server in response to the usage data subscription.

9. The method of claim 8 wherein the UE signaling comprises a Non-Access Stratum (NAS) file from the UE.

10. The method of claim 8 wherein the UE signaling indicates the user application in the UE.

11. The method of claim 8 wherein the network signaling indicates a VPN policy for the UE.

12. The method of claim 8 wherein the usage data identifies the user application and the external data system.

13. The method of claim 8 further comprising the NEF transferring the usage data to a network accounting system.

14. A data communication network to serve a user application in User Equipment (UE), the data communication network comprising:

a Network Function Virtualization Infrastructure (NFVI) to execute a Network Exposure Function (NEF), the NEF to receive a subscription from an application server, wherein the subscription is for user data from the user application in the UE;
a Virtual Private Network (VPN) to receive the user data from the user application in the UE and transfer the user data to the NEF; and
the NEF to transfer the user data for delivery to the application server in response to the subscription.

15. The data communication network of claim 14 further comprising the NEF to transfer usage data for delivery to the application server in response to the subscription, wherein the usage data characterizes the user data transfer by UE identifier.

16. The data communication network of claim 14 further comprising the NEF to transfer usage data for delivery to the application server in response to the subscription, wherein the usage data characterizes the user data transfer by UE location.

17. The data communication network of claim 14 further comprising the NEF to transfer usage data for delivery to the application server in response to the subscription, wherein the usage data characterizes the user data transfer by application identifier.

18. The data communication network of claim 14 further comprising the NEF to transfer usage data for delivery to the application server in response to the subscription, wherein the usage data characterizes the user data by VPN information.

19. The data communication network of claim 14 further comprising the NEF to transfer usage data for delivery to the application server in response to the subscription, wherein the usage data characterizes the user data by data amount.

20. The data communication network of claim 14 further comprising:
the NEF to receive an application instruction for the user application in the UE from the application server and transfer the application instruction to the VPN; and
the VPN to transfer the application instruction to the user application in the UE.

* * * * *